United States Patent
Arimura et al.

(10) Patent No.: US 8,002,980 B2
(45) Date of Patent: Aug. 23, 2011

(54) HEAVY METAL COLLECTION SYSTEM

(75) Inventors: Ryoichi Arimura, Musashino (JP);
Nobuyuki Ashikaga, Kawasaki (JP);
Takashi Menju, Kawasaki (JP); Atsushi Yukawa, Tokyo (JP); Hiromi Tsukui, Tokyo (JP); Hirofumi Noguchi, Yokohama (JP); Shinji Oono, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 439 days.

(21) Appl. No.: 12/205,450

(22) Filed: Sep. 5, 2008

(65) Prior Publication Data
US 2009/0065441 A1    Mar. 12, 2009

(30) Foreign Application Priority Data

Sep. 6, 2007  (JP) ............... P2007-231595

(51) Int. Cl.
*C02F 1/461* (2006.01)
*C02F 1/62* (2006.01)
*C02F 101/20* (2006.01)

(52) U.S. Cl. ............ 210/192; 204/660; 210/195.1; 210/199; 210/202; 210/205

(58) Field of Classification Search ............ 210/192
See application file for complete search history.

(56) References Cited

U.S. PATENT DOCUMENTS

| | | | |
|---|---|---|---|
| 4,218,431 A * | 8/1980 | Spevack | 423/563 |
| 4,354,937 A * | 10/1982 | Hallberg | 210/607 |
| 4,424,126 A * | 1/1984 | Santhanam et al. | 210/195.1 |
| 6,852,305 B2 * | 2/2005 | Buisman et al. | 423/564 |
| 7,264,733 B2 * | 9/2007 | Matsunami et al. | 210/709 |
| 7,279,103 B2 * | 10/2007 | Burckle et al. | 210/610 |
| 7,862,721 B2 * | 1/2011 | Ollivier et al. | 210/603 |

FOREIGN PATENT DOCUMENTS

| | | |
|---|---|---|
| CN | 1326512 A | 12/2001 |
| JP | 62-193697 | 8/1987 |
| JP | 2002-210436 | 7/2002 |
| WO | WO 00/29605 | 5/2000 |

OTHER PUBLICATIONS

First Office Action issued by the Chinese Patent Office on Jun. 7, 2010, for Chinese Patent Application No. 200810212573.5, and English-language translation of main text of First Office Action.

* cited by examiner

*Primary Examiner* — Peter A Hruskoci
(74) *Attorney, Agent, or Firm* — Finnegan, Henderson, Farabow, Garrett & Dunner, L.L.P.

(57) ABSTRACT

A former (11) works, when supplied with wastewater containing heavy metals and hydrogen sulfide, to react heavy metals contained in wastewater with hydrogen sulfide to form sulfide salts, an acquirer (12) works, when supplied with sulfide salts and acid, to acquire hydrogen sulfide and heavy metal ions produced by reactions between sulfide salts and acid, a hydrogen sulfide supply line (13) supplies hydrogen sulfide acquired by the acquirer to the former, and a collection line (20) collects heavy metal ions.

6 Claims, 3 Drawing Sheets

HEAVY METAL COLLECTION SYSTEM

CROSS REFERENCE TO RELATED APPLICATIONS

The present application claims the benefit of priority under 35 U.S.C. §119 to Japanese Patent Application No. 2007-231595, filed on Sep. 6, 2007, the entire contents of which are incorporated herein by reference.

BACKGROUND OF THE INVENTION

1. Field of Art

The present invention relates to a heavy metal collection system and a heavy metal collection method for use of a substance produced in a wastewater processing to collect heavy metals from wastewater containing heavy metals.

2. Description of Relevant Art

Wastewater, such as industrial effluent, may contain heavy metals harmful to humans, e.g. mercury, lead, cadmium, chrome, etc. Such harmful heavy metals should be removed from wastewater.

As an example for removal of heavy metals from wastewater containing heavy metals (heavy-metal containing wastewater), there is a method of removing heavy metals from heavy-metal containing wastewater simply to meet a prescribed (effluent standard) value, and disposing of removed heavy metals as waste. Heavy metals of heavy-metal containing wastewater may be collected as valuable resources for recycle, to make effective use of heavy metals contained in wastewater.

Also as measures for collection of target substances such as heavy metals of wastewater, there are "unit processing techniques" for simple collection of target substances, and "composite techniques" as combinations of unit processing techniques for collection of target substances, among others, to be used as necessary for objectives.

As unit processing techniques there are e.g. "electrolysis method" and "alkaline precipitation method (coagulation sedimentation method)". The electrolysis method has a pair of electrodes (anode, cathode) inserted in heavy-metal containing wastewater, for current conduction between the electrodes to deposit heavy metals thereon. The alkaline precipitation method has an alkaline chemical, such as caustic soda or slack lime, added to heavy-metal containing wastewater for sedimentation of heavy metals as hydrates.

As an exemplary method for composite techniques, there is a "sulfide method". In the sulfide method, sodium sulfide or hydrogen sulfide is added to heavy-metal containing wastewater for precipitation and removal of heavy metals as sulfide salts. For use in the sulfide method, hydrogen sulfide may be generated from combination of sulfuric acid ions and organics by actions of sulfate-reducing bacteria under an anaerobic condition, for example. Sulfuric acid ions may be generated from simple sulfur by actions of sulfur-oxidizing bacteria, for example.

As a method of processing heavy-metal containing wastewater, there has been a technique disclosed in JP 2002-210436 A (Japanese Patent Application Laying-Open Publication No. 2002-210436) in which hydrogen sulfide is generated from a first wastewater containing sulfuric acid ions and organics by actions of sulfate-reducing bacteria, and added to a second wastewater containing heavy metals, for insolubilization of heavy metals as sulfide salts. The technique disclosed in JP 2002-210436 A is an effective method for separate supply of "a first wastewater containing sulfuric acid ions and organics" and "a second wastewater simply containing heavy metals", where hydrogen sulfide from a processing of the first wastewater is available for processing the second wastewater.

There has been a technique disclosed in JP S62-193697 A (Japanese Patent Application Laying-Open Publication No. S62-193697), which generated hydrogen sulfide by sulfate-reducing bacteria and produced sulfide salts of heavy metals in identical system (an integrated reduction tank). In the technique disclosed in JP S62-193697 A, heavy-metal containing wastewater, sulfate-reducing bacteria, and nutrient salts for their growth are mixed together. And then, hydrogen sulfide are generated by actions of sulfate-reducing bacteria, at the same time heavy metals as sulfide salts are precipitated. In this system sulfide salts are used as adsorption carriers for proliferation of bacteria.

Generally, wastewater has a variety of contents. As a result, there are few cases where the technique disclosed in JP 2002-210436 A is applicable, that is, where "a first wastewater containing sulfuric acid ions and organics" and "a second wastewater simply containing heavy metals" must be separately and concurrently obtainable. JP 2002-210436 A describes techniques for removal of heavy metals from wastewater, without making consideration of heavy metals in insolubilized sulfide salts that may be valuable resources for collection of pure metals. JP 62-193697A employs sulfide salts of heavy metals as carriers, in no consideration of collecting heavy metals from sulfide salts, as valuable resources containing no impurities.

It is an object of the present invention to provide a heavy metal collection system and a heavy metal collection method for effective use of substances produced in a wastewater processing to collect heavy metals from wastewater containing heavy metals.

SUMMARY OF THE INVENTION

According to an aspect of the present invention, to achieve the object, a heavy metal collection system comprises: a former adapted, when supplied with wastewater containing heavy metals and hydrogen sulfide, to react heavy metals contained in supplied wastewater with supplied hydrogen sulfide to form sulfide salts; an acquirer adapted, when supplied with sulfide salts formed by the former and acid, to acquire hydrogen sulfide and heavy metal ions produced by reactions between supplied sulfide salts and supplied acid; a hydrogen sulfide supply line configured to supply hydrogen sulfide acquired by the acquirer to the former; and a collection line configured to collect heavy metal ions acquired by the acquirer.

According to another aspect of the present invention, a heavy metal collection system comprises: an acquirer adapted, when supplied with sulfide salts and hydrochloric acid, to acquire hydrogen sulfide and heavy metal ions produced by reactions between supplied sulfide salts and supplied hydrochloric acid; a precipitator configured for electrolysis of heavy metal ions acquired by the acquirer to deposit metals on an electrode; and an acid producer configured for use of chlorine gases produced by electrolysis in the precipitator to produce hydrochloric acid, for supply to the acquirer.

According to another aspect of the present invention, a heavy metal collection system comprises: a former adapted, when supplied with wastewater containing heavy metals and hydrogen sulfide, to react heavy metals contained in supplied wastewater with supplied hydrogen sulfide to form sulfide salts; a sulfur oxidizer adapted, when supplied with sulfide salts formed by the former, to have sulfuric acid ions generated by actions of sulfur-oxidizing bacteria residing therein; a sulfate reducer adapted, when supplied with sulfuric acid ions generated in the sulfur oxidizer and organics, to have hydrogen sulfide and heavy metal ions generated by actions of sulfate-reducing bacteria residing therein under an anaerobic condition; a hydrogen sulfide supply line configured to supply hydrogen sulfide generated in the sulfate reducer to the former; and a collection line configured to collect heavy metal ions generated in the sulfate reducer.

According to another aspect of the present invention, a heavy metal collection method comprises the steps of: supplying wastewater containing heavy metals, supplying hydrogen sulfide from a hydrogen sulfide supply line, reacting heavy metals contained in supplied wastewater with supplied hydrogen sulfide, forming sulfide salts; supplying formed sulfide salts and acid, acquiring hydrogen sulfide and heavy metal ions produced by reactions between supplied sulfide salts and supplied acid; supplying acquired hydrogen sulfide to the hydrogen sulfide supply line; and collecting acquired heavy metal ions.

According to another aspect of the present invention, a heavy metal collection method comprises the steps of: supplying sulfide salts, supplying hydrochloric acid from a hydrochloric acid supply line, acquiring hydrogen sulfide and heavy metal ions produced by reactions between supplied sulfide salts and supplied hydrochloric acid; applying electrolysis to acquire heavy metal ions, depositing metals on an electrode, producing chlorine gases; producing hydrochloric acid by using produced chlorine gases; and supplying produced hydrochloric acid to the hydrochloric acid supply line.

According to another aspect of the present invention, a heavy metal collection method comprises the steps of: supplying wastewater containing heavy metals and hydrogen sulfide, reacting heavy metals contained in supplied wastewater with supplied hydrogen sulfide, forming sulfide salts; supplying formed sulfide salts, having sulfuric acid ions generated by actions of sulfur-oxidizing bacteria; supplying generated sulfuric acid ions and organics, having hydrogen sulfide and heavy metal ions generated by actions of sulfate-reducing bacteria under an anaerobic condition; and collecting generated heavy metal ions.

DETAILED DESCRIPTION OF THE EMBODIMENTS

Figure 1:
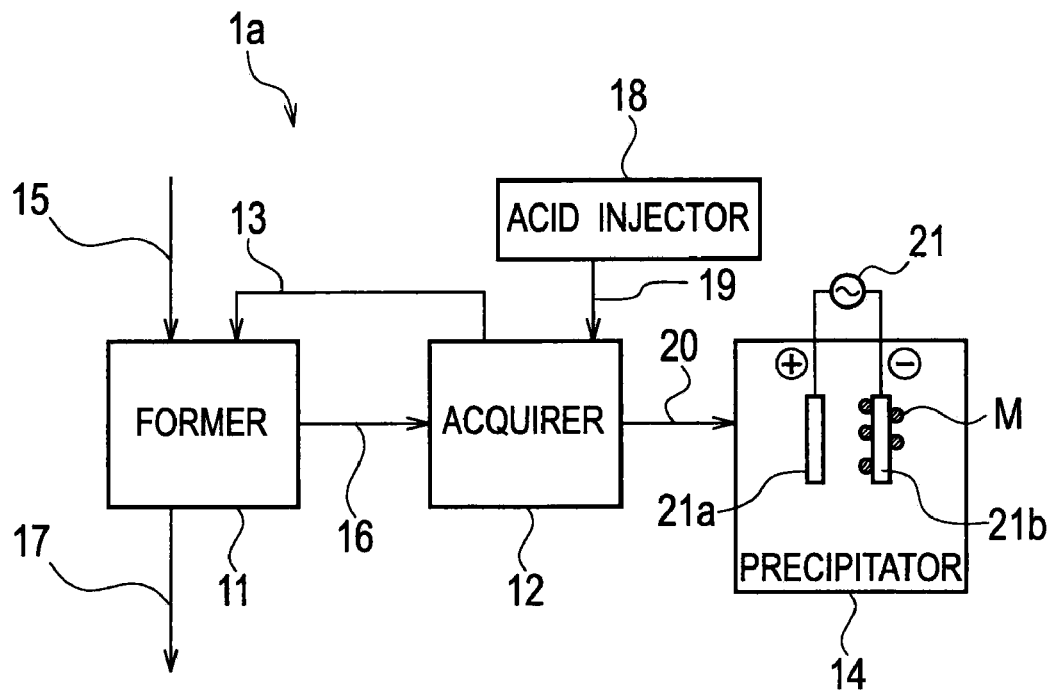
FIG. 1 is a functional block diagram of a heavy metal collection system according to a first embodiment of the present invention.

There will be described below heavy metal collection systems according to the preferred embodiments of the present invention, with reference to the accompanying drawings. The heavy metal collection systems are described as an apparatus for collecting heavy metals by processing heavy-metal containing wastewater effluent from a factory or the like. Like components are designated by like reference characters, eliminating redundancy.

First Embodiment

As shown in FIG. 1, according to the first embodiment, a heavy metal collection system $1a$ includes: a former 11 adapted, when supplied with wastewater containing heavy metals and hydrogen sulfide, to react heavy metals contained in supplied wastewater with supplied hydrogen sulfide to form sulfide salts; an acquirer 12 adapted, when supplied with sulfide salts formed by the former 11 and acid, to acquire hydrogen sulfide and heavy metal ions produced by reactions between supplied sulfide salts and supplied acid; and a hydrogen sulfide supply line 13 configured to supply hydrogen sulfide acquired by the acquirer 12 to the former 11. The heavy metal collection system $1a$ includes a precipitator 14 configured for electrolysis of heavy metal ions acquired by the acquirer 12 to deposit heavy metals M on an electrode.

The former 11 has heavy-metal containing wastewater supplied thereto from a supply line 15, as a target to be processed in the heavy metal collection system $1a$, and hydrogen sulfide supplied thereto through the hydrogen sulfide supply line 13. The former 11 reacts heavy metals contained in supplied wastewater with supplied hydrogen sulfide, forming sulfide salts of heavy metals by a sulfide method. Formed sulfide salts are supplied from the former 11 to the acquirer 12, through a supply line 16. The former 11 has a discharge line 17 for discharging treated water as effluent after removal of heavy metals in the form of sulfide salts from heavy-metal containing wastewater More specifically, the former 11 has a water tank (not shown), where formed sulfide salts precipitate, so precipitated sulfide salt contents of wastewater are extracted, and supplied to the acquirer 12 through the supply line 16. After extraction of precipitated sulfide salts, the rest of wastewater resides in the water tank of the former 11, as treated water deprived of heavy metals, which is discharged outside through the discharge line 17. Treated water is effluent from the discharge line 17, and supplied to other processing equipment or let out to sewage or the like, in accordance with a property of treated water.

The acquirer 12 has sulfide salts supplied thereto from the former 11 through the supply line 16, and hydrochloric acid supplied thereto from an acid injector 18 through an acid supply line 19. In the acquirer 12, supplied sulfide salts react with supplied hydrochloric acid, producing hydrogen sulfide and heavy metal ions. Heavy metals once combined with sulfur contents (hydrogen sulfide) in the former 11 are thereby re-separated from sulfur contents in the acquirer 12.

Produced hydrogen sulfide is thus acquired in the acquirer 12, and supplied through the hydrogen sulfide supply line 13 to the former 11. Produced heavy metal ions are thus acquired in the acquirer 12, and supplied to the precipitator 14 through a heavy metal ion supply line 20. This line 20 serves as a line (referred herein sometimes to "collect line") to collect ionized heavy metals for final collection of heavy metals.

The acid injector 18 may supply the acquirer 12 with an acid else than hydrochloric acid, such as sulfuric acid, as necessary. A required acid, such as hydrochloric acid or sulfuric acid, is stored in advance in an internal tank (not shown) of the acid injector 18, and supplied therefrom to the acquirer 12 by quantities depending on amounts of sulfide salts supplied thereto from the former 11.

The precipitator 14 includes an electrolytic apparatus 21 with a pair of electrodes being an anode 21a and a cathode 21b. When heavy metal ions are supplied from the acquirer 12 through the collection line 20 to the precipitator 14, the electrolytic apparatus 21 applies electrolysis to supplied heavy metal ions, so heavy metals M deposited on the cathode 21b. Heavy metals M thus deposited on the cathode 21b of electrolytic apparatus 21 are collected, permitting the heavy metal collection system 1a to collect heavy metals M free of impurities, as valuable resources.

The heavy metal collection system 1a according to the first embodiment thus allows for collection of heavy metals M free of impurities, as valuable resources from heavy-metal containing wastewater, by using electrolysis.

In the heavy metal collection system 1a, hydrogen sulfide is produced in the course of acquiring heavy metal ions at the acquirer 12, and utilized at the former 11 standing in a front stage thereof. The heavy metal collection system 1a can thus do simply with a minimized amount of hydrogen sulfide stored for use in formation of sulfide salts, allowing for reduced chemical expenses as well as reduced chemical management costs by effective utilization of a substance (hydrogen sulfide) produced in the way of heavy metal collection.

Modification of the First Embodiment

Figure 2:
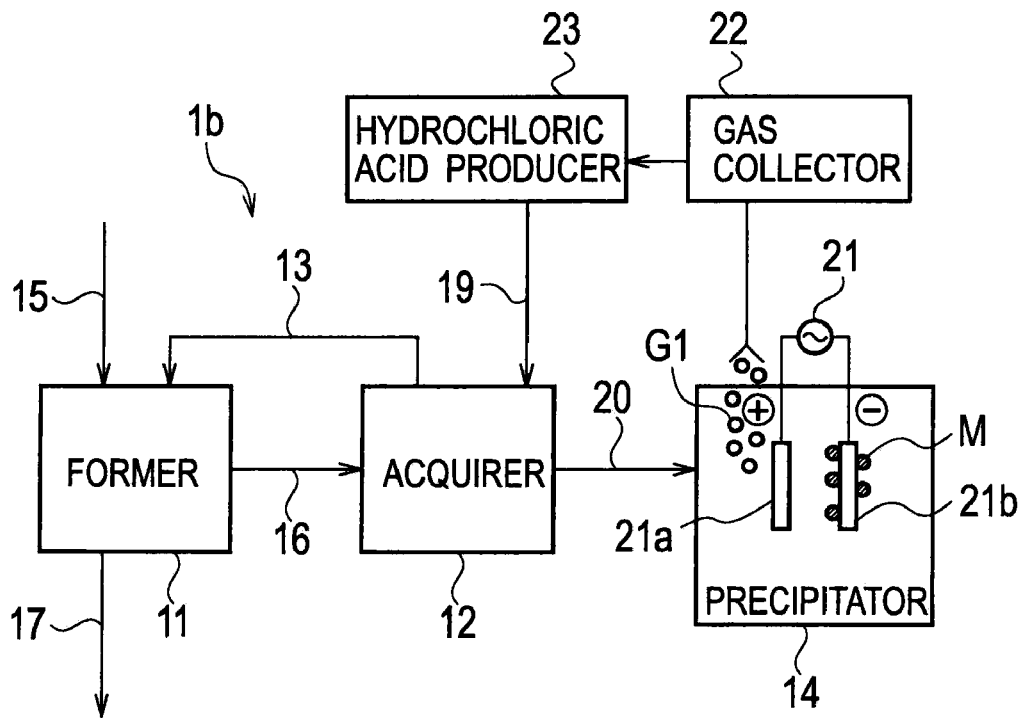
FIG. 2 is a functional block diagram of a heavy metal collection system according to a modification of the first embodiment of the present invention.

FIG. 2 shows a heavy metal collection system 1b according to a modification of the first embodiment, which is different from the heavy metal collection system 1a of FIG. 1 in that the acid injector 18 of the latter 1a is replaced by combination of a gas collector 22 and a hydrochloric acid producer 23.

A precipitator 14 has chlorine gases G1 produced during electrolysis of heavy metal ions. Chlorine gases G1 produced in the precipitator 14 are collected by the gas collector 22, and sent to the hydrochloric acid producer 23. Chlorine gases G1 supplied thereto from the gas collector 22 are utilized to produce hydrochloric acid in the hydrochloric acid producer 23. Hydrochloric acid produced in the hydrochloric acid producer 23 is pooled in a storage tank (not shown) of the hydrochloric acid producer 23, so the hydrochloric acid producer 23 can supply hydrochloric acid through an acid supply line 19 to an acquirer 12, by quantities depending on amounts of sulfide salts supplied thereto from a former 11 through a supply line 16, like the acid injector 18. The hydrochloric acid producer 23 may well be a conventional facility in which chlorine gases G1 are absorbed in water to produce hydrochloric acid, for example.

The heavy metal collection system 1b according to the modification of the first embodiment thus employs chlorine gases G1 produced during electrolysis in the precipitator 14 to produce hydrochloric acid, which is supplied to the acquirer 12, where it is added to sulfide salts, for utilization to effect the separation into hydrogen sulfide and heavy metals. The heavy metal collection system 1b can thus do simply with storage of a minimized amount of acid, allowing for reduced chemical expenses as well as reduced chemical management costs by effective utilization of a substance (chlorine gas) produced along with electrolysis in the way of heavy metal collection.

Second Embodiment

Figure 3:
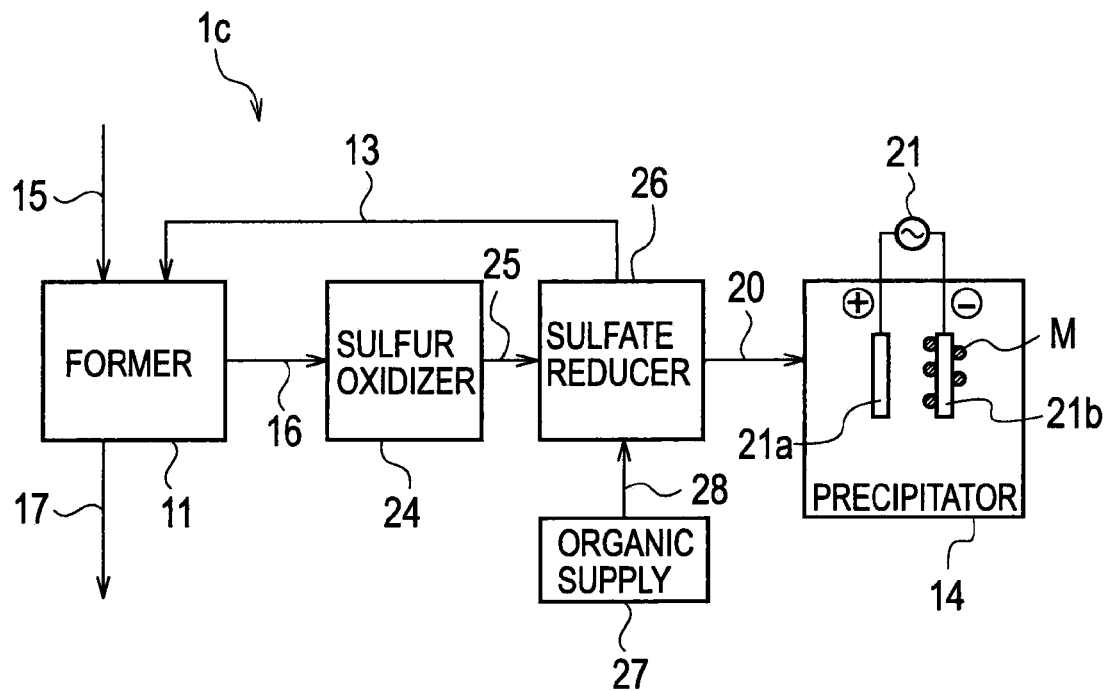
FIG. 3 is a functional block diagram of a heavy metal collection system according to a second embodiment of the present invention.

As shown in FIG. 3, according to the second embodiment, a heavy metal collection system 1c includes: a former 11 adapted, when supplied with wastewater containing heavy metals and hydrogen sulfide, to react heavy metals contained in supplied wastewater with supplied hydrogen sulfide to form sulfide salts of heavy metals; a sulfur oxidizer 24 adapted, when supplied with sulfide salts of heavy metals, to have sulfuric acid ions and heavy metal ions generated by actions of sulfur-oxidizing bacteria residing therein; a sulfate reducer 26 adapted, when supplied with organics and sulfuric acid ions (together with heavy metal ions), to have a combination of hydrogen sulfide and heavy metal ions generated (in the manner of having hydrogen sulfide generated and heavy metal ions left residual as they are) by actions of sulfate-reducing bacteria residing therein under an anaerobic condition; and a hydrogen sulfide supply line 13 configured to supply hydrogen sulfide generated in the sulfate reducer 26 to the former 11. The heavy metal collection system 1c includes a precipitator 14 configured for electrolysis of heavy metal ions collected from the sulfate reducer 26, to deposit heavy metals M on an electrode 21b.

The former 11 is configured like that in the first embodiment shown in FIG. 1, while formed sulfide salts are supplied through a supply line 16 to the sulfur oxidizer 24.

The sulfur oxidizer 24 has sulfur-oxidizing bacteria residing therein, which act on sulfide salts supplied through the supply line 16 from the former 11, oxidizing sulfur, thereby generating sulfuric acid ions. Therefore, when supplied with sulfide salts, the sulfur oxidizer 24 has sulfuric acid ions and heavy metal ions generated from sulfide salts by actions of sulfur-oxidizing bacteria. Heavy metals (hydrogen sulfide) as combined with sulfur contents in the former 11 are again separated from sulfur contents in the sulfur oxidizer 24. Generated sulfuric acid ions and heavy metal ions are supplied through a supply line 25 from the sulfur oxidizer 24 to the sulfate reducer 26.

The sulfate reducer 26 is supplied with organics from an organic supply 27, besides sulfuric acid ions supplied from the sulfur oxidizer 24. The organic supply 27 includes: an internal storage tank (not shown), where it has stored organics degradable by sulfate-reducing bacteria; and an organic supply line 28, through which the sulfate reducer 26 is supplied with a quantity of organics corresponding to an amount of sulfuric acid ions supplied from the sulfur oxidizer 24 to the sulfate reducer 26.

The sulfate reducer 26 has sulfate-reducing bacteria residing therein, which act on supplied sulfuric acid ions and organics under an anaerobic condition, reducing sulfuric acid ions, thereby generating hydrogen sulfide. Inside of the sulfate reducer 26 is held in an anaerobic condition. Therefore, when supplied with sulfuric acid ions and organics, the sulfate reducer 26 has hydrogen sulfide generated from sulfuric acid ions and organics by actions of sulfate-reducing bacteria. Generated hydrogen sulfide is supplied through the hydrogen sulfide supply line 13 from the sulfate reducer 26 to the former 11. Heavy metal ions supplied from the sulfur oxidizer 24 are collected through a collection line 20 from the sulfate reducer 26 to the precipitator 14.

The precipitator 14 is configured like that in the first embodiment shown in FIG. 1. That is, when heavy metal ions are supplied from the sulfate reducer 26 through the collection line 20 to the precipitator 14, an electrolytic apparatus 21 applies electrolysis to supplied heavy metal ions, so heavy metals M is deposited on the cathode 21b. Heavy metals M thus deposited on the cathode 21b of electrolytic apparatus 21 are collected, permitting the heavy metal collection system 1c to collect heavy metals M free of impurities, as valuable resources.

The heavy metal collection system 1c according to the second embodiment thus allows for collection of heavy metals M free of impurities, as valuable resources from heavy-metal containing wastewater, by using electrolysis.

In the heavy metal collection system 1c, hydrogen sulfide is produced at the sulfate reducer 26 in the course of acquiring heavy metal ions, and utilized at the former 11 standing in a front stage thereof. The heavy metal collection system 1c can thus do simply with a minimized amount of hydrogen sulfide stored for use in formation of sulfide salts, allowing for effective utilization of a substance (hydrogen sulfide) produced in the way of heavy metal collection.

First Modification of the Second Embodiment

Figure 4:
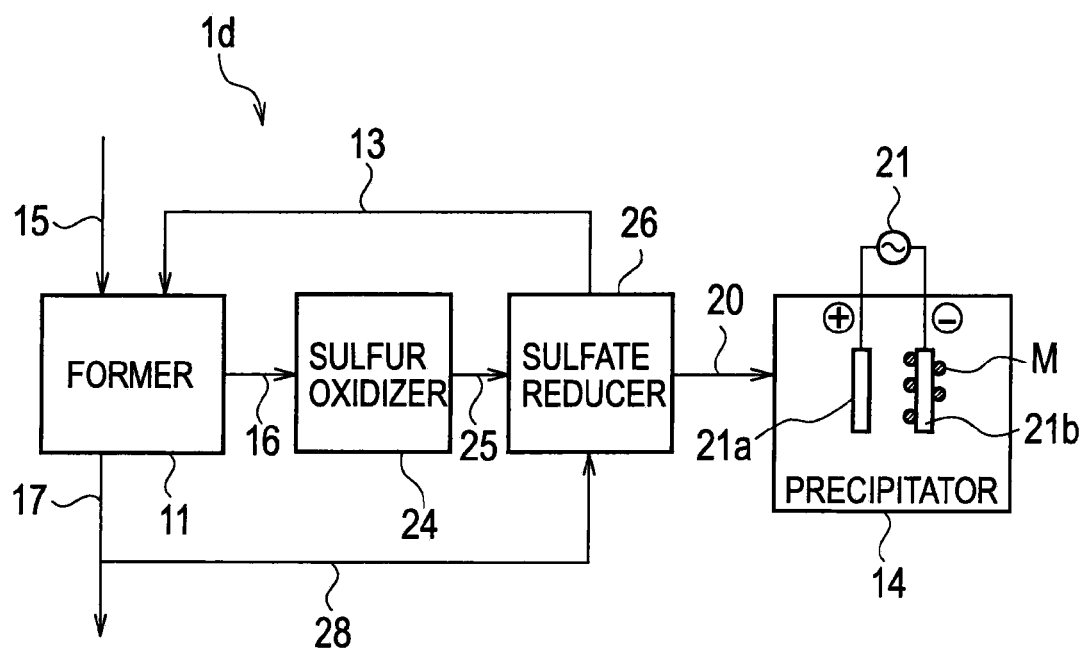
FIG. 4 is a functional block diagram of a heavy metal collection system according to a modification of the second embodiment of the present invention.

FIG. 4 shows a heavy metal collection system 1d according to a first modification of the second embodiment, which is different from the heavy metal collection system 1c of FIG. 3 in that the organic supply 27 of the latter 1c is omitted, simply equipping an organic supply line 28.

At a former 11, wastewater is deprived of heavy metals, and discharged as treated water through a discharge line 17, which may contain organics on which sulfate-reducing bacteria can act. For treated water containing organics, the organic supply line 28 serves to supply a sulfate reducer 26 with treated water discharged from the former 11. Given organic-containing treated water supplied through the organic supply line 28 and sulfuric acid ions supplied from a sulfur oxidizer 24, the sulfate reducer 26 has hydrogen sulfide generated by actions of sulfate-reducing bacteria. Generated hydrogen sulfide is supplied through a hydrogen sulfide supply line 13 from the sulfate reducer 26 to the former 11, like heavy metal collection system 1c.

The heavy metal collection system 1d according to the first modification of the second embodiment thus employs heavy-metal containing wastewater deprived of heavy metals at the former 11, as treated water containing organics, which is supplied to the sulfate reducer 26, for utilization as a material degradable by sulfate-reducing bacteria. The heavy metal collection system 1d can thus do with no storage of organics, allowing for effective utilization of a substance (organics) contained in treated water produced in the way of processing heavy-metal containing wastewater.

For treated water discharged from the former 11, as containing organics difficult to degrade by sulfate-reducing bacteria, there may well be a pretreatment on treated water to render organics therein easily degradable by sulfate-reducing bacteria, before the supply to the sulfate reducer 26.

Second Modification of the Second Embodiment

Figure 5:
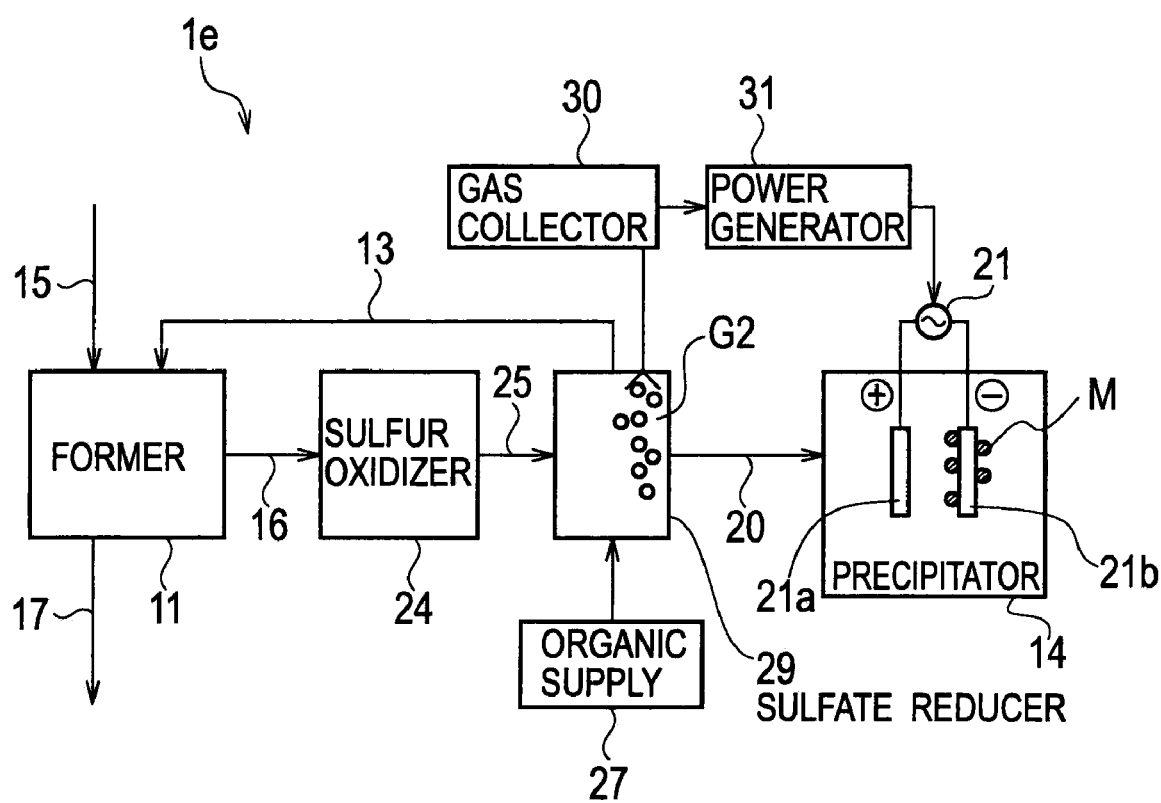
FIG. 5 is a functional block diagram of a heavy metal collection system according to another modification of the second embodiment of the present invention.

FIG. 5 shows a heavy metal collection system 1e according to a second modification of the second embodiment, which is different from the heavy metal collection system 1c of FIG. 3 in that the sulfate reducer 26 of the latter 1c is replaced by combination of a sulfate reducer 29, a gas collector 30, and a power generator 31.

The sulfate reducer 29 has sulfate-reducing bacteria and methane-producing bacteria residing therein. Methane-producing bacteria act on supplied organics under an anaerobic condition, thereby generating gaseous methane G2. That is, given sulfuric acid ions supplied (together with heavy metal ions) from a sulfur oxidizer 24 and organics supplied from an organic supply 27, the sulfate reducer 29 in an anaerobic condition has hydrogen sulfide generated therein by sulfate-reducing bacteria acting on sulfuric acid ions and organics, and gaseous methane G2 generated therein by methane-producing bacteria acting on organics. Generated hydrogen sulfide is supplied through a hydrogen sulfide supply line 13 from the sulfate reducer 29 to a former 11. Heavy metal ions supplied from the sulfur oxidizer 24 are collected through a collection line 20 from the sulfate reducer 29 to a precipitator 14.

The gas collector 30 collects gaseous methane G2 generated in the sulfate reducer 29, for supply to the power generator 31. The power generator 31 is a conventional facility for power generation by methane, and employs gaseous methane G2 supplied from the gas collector 30 to generate electricity as electric power. Generated electric power is supplied from the power generator 31 to an electrolytic apparatus 21, where it is used for electrolysis.

The heavy metal collection system 1e according to the second modification of the second embodiment thus employs gaseous methane G2 generated by actions of methane-producing bacteria residing together with sulfate-reducing bacteria in the sulfate reducer 29, for generation of electric power to supply the electrolytic apparatus 21 with necessary electric power for electrolysis. The heavy metal collection system 1e thus allows for effective utilization as an electric energy source of a substance (methane) produced in the way of processing heavy-metal containing wastewater.

It is noted that electric power generated at the power generator 31 may be supplied not simply to the electrolytic apparatus 21, but also to other equipment needing electric energy inside or outside the heavy metal collection system 1e. For a state of the electrolytic apparatus 21 needing greater electric power than generation by the power generator 31, another power supply may be used in combination. It also is noted that organics contained in treated water discharged from the former 11 may be supplied to the sulfate reducer 29, like the heavy metal collection system 1d.

According to the present invention, heavy metals can be efficiently collected from heavy-metal containing wastewater, by making use of a substance produced in a wastewater processing.

While preferred embodiments of the present invention have been described using specific terms, such description is for illustrative purposes, and it is to be understood that changes and variations may be made without departing from the spirit or scope of the following claims.

What is claimed is:

1. A heavy metal collection system comprising:
    a former configured to be supplied with wastewater containing heavy metals and hydrogen sulfide, to react the heavy metals contained in supplied wastewater with the supplied hydrogen sulfide to form sulfide salts;
    an acquirer configured to be supplied with the sulfide salts formed by the former and hydrochloric acid, to acquire hydrogen sulfide and heavy metal ions produced by reactions between supplied sulfide salts and the supplied hydrochloric acid;
    a hydrogen sulfide supply line configured to supply the hydrogen sulfide acquired by the acquirer to the former;
    a collection line configured to collect the heavy metal ions acquired by the acquirer;
    a precipitator configured for electrolysis of the heavy metal ions from the collection line to deposit metals on an electrode; and
    an acid producer configured for use of chlorine gases produced by the electrolysis in the precipitator to produce the hydrochloric acid supplied to the acquirer.

2. A heavy metal collection system comprising:
    a former configured to be supplied with wastewater containing heavy metals and hydrogen sulfide, to react the heavy metals contained in supplied wastewater with the supplied hydrogen sulfide to form sulfide salts;

an acquirer configured to be supplied with the sulfide salts formed by the former and hydrochloric acid, to acquire hydrogen sulfide and heavy metal ions produced by reactions between the supplied sulfide salts and the supplied hydrochloric acid;

a collection line configured to collect the heavy metal ions acquired by the acquirer;

a precipitator configured for electrolysis of the heavy metal ions acquired by the acquirer to deposit metals on an electrode; and an acid producer configured for use of chlorine gases produced by the electrolysis in the precipitator to produce the hydrochloric acid supplied to the acquirer.

3. A heavy metal collection system comprising:

a former configured to be supplied with wastewater containing heavy metals and hydrogen sulfide, to react the heavy metals contained in supplied wastewater with the supplied hydrogen sulfide to form sulfide salts;

a sulfur oxidizer configured to be supplied with the sulfide salts formed by the former, to have sulfuric acid ions generated by actions of sulfur-oxidizing bacteria residing therein;

a sulfate reducer configured to be supplied with the sulfuric acid ions generated in the sulfur oxidizer and organics, to have hydrogen sulfide and heavy metal ions generated by actions of sulfate-reducing bacteria residing therein under an anaerobic condition;

a hydrogen sulfide supply line configured to supply the hydrogen sulfide generated in the sulfate reducer to the former;

a collection line configured to collect the heavy metal ions generated in the sulfate reducer; and a precipitator configured for electrolysis of the heavy metal ions from the collection line.

4. A heavy metal collection system comprising:

a former configured to be supplied with wastewater containing heavy metals and hydrogen sulfide, to react the heavy metals contained in supplied wastewater with the supplied hydrogen sulfide to form sulfide salts;

a sulfur oxidizer configured to be supplied with the sulfide salts formed by the former, to have sulfuric acid ions generated by actions of sulfur-oxidizing bacteria residing therein;

a sulfate reducer configured to be supplied with wastewater containing residual organics after formation of sulfide salts in the former and the sulfuric acid ions generated in the sulfur oxidizer, to have hydrogen sulfide and heavy metal ions generated by actions of sulfate-reducing bacteria residing therein under an anaerobic condition;

a collection line configured to collect the heavy metal ions generated in the sulfate reducer; and a precipitator configured for electrolysis of the heavy metal ions from the collection line.

5. A heavy metal collection system comprising:

a former configured to be supplied with wastewater containing heavy metals and hydrogen sulfide, to react the heavy metals contained in supplied wastewater with the supplied hydrogen sulfide to form sulfide salts;

a sulfur oxidizer configured to be supplied with the sulfide salts formed by the former, to have sulfuric acid ions generated by actions of sulfur-oxidizing bacteria residing therein;

a sulfate reducer configured to be supplied with the sulfuric acid ions generated in the sulfur oxidizer and organics, to have hydrogen sulfide and heavy metal ions generated by actions of sulfate-reducing bacteria residing therein under an anaerobic condition and methane generated by actions of methane-producing bacteria residing therein;

a collection line configured to collect the heavy metal ions generated in the sulfate reducer; and a precipitator configured for electrolysis of the heavy metal ions from the collection line.

6. The heavy metal collection system according to claim 5, comprising:

a power generator supplied with methane generated in the sulfate reducer and configured to generate electricity from supplied methane; and the precipitator configured for use of the electricity generated at the power generator to apply electrolysis to heavy metal ions from the collection line, to deposit metals on an electrode.

\* \* \* \* \*